United States Patent
Wang et al.

(10) Patent No.: US 10,878,839 B2
(45) Date of Patent: Dec. 29, 2020

(54) DEVICE FOR PREVENTING CABLES AGAINST EXTERNAL DAMAGE BASED ON SOUND SOURCE LOCALIZATION

(71) Applicant: STATE GRID SHANGHAI MUNICIPAL ELECTRIC POWER COMPANY, Shanghai (CN)

(72) Inventors: Mei Wang, Shanghai (CN); Hai Li, Shanghai (CN); Tianyu Qian, Shanghai (CN); Xiaodi Wang, Shanghai (CN); Pingping Xu, Shanghai (CN); Jialiang Yuan, Shanghai (CN); Zhe Song, Shanghai (CN); Shenfu Zhang, Shanghai (CN); Haowen Zhao, Shanghai (CN); Wei Huang, Shanghai (CN); Zhi Xu, Shanghai (CN); Hong Zhou, Shanghai (CN); Yuechao Chen, Shanghai (CN); Junchen Zhu, Shanghai (CN); He He, Shanghai (CN)

(73) Assignee: STATE GRID SHANGHAI MUNICIPAL ELECTRIC POWER COMPANY, Shanghai (CN)

( * ) Notice: Subject to any disclaimer, the term of this patent is extended or adjusted under 35 U.S.C. 154(b) by 0 days.

(21) Appl. No.: 16/466,991

(22) PCT Filed: Jun. 28, 2018

(86) PCT No.: PCT/CN2018/093301
§ 371 (c)(1),
(2) Date: Jun. 5, 2019

(87) PCT Pub. No.: WO2019/015455
PCT Pub. Date: Jan. 24, 2019

(65) Prior Publication Data
US 2020/0090679 A1     Mar. 19, 2020

(30) Foreign Application Priority Data
Jul. 21, 2017 (CN) .......................... 2017 1 0600273

(51) Int. Cl.
*G10L 25/51* (2013.01)
*G06F 16/683* (2019.01)
(Continued)

(52) U.S. Cl.
CPC ............ *G10L 25/51* (2013.01); *G06F 16/683* (2019.01); *H04N 5/23203* (2013.01); *H04N 7/18* (2013.01); *H04R 1/406* (2013.01); *H04R 3/005* (2013.01)

(58) Field of Classification Search
CPC ....... G10L 25/51; G10L 25/57; G06F 16/683; H04N 5/23203; H04N 7/18; H04R 1/406; H04R 3/005
(Continued)

(56) References Cited

U.S. PATENT DOCUMENTS

2007/0143820 A1* 6/2007 Pawlowski ............. G11B 27/11
725/145
2010/0238020 A1 9/2010 Pellen

FOREIGN PATENT DOCUMENTS

CN    103399293 A    11/2013
CN    105205962 A    12/2015
(Continued)

OTHER PUBLICATIONS

Sigard, Sound Intelligence, 2017.*
(Continued)

*Primary Examiner* — William A Jerez Lora
(74) *Attorney, Agent, or Firm* — Hamre, Schumann, Mueller & Larson, P.C.

(57) ABSTRACT

A device for preventing cables against external damage based on sound source localization comprises a power
(Continued)

supply unit, and a sound source sensor unit, a camera unit, a signal processing unit and a wireless communication unit which are electrically connected to the power supply unit. The signal processing unit is connected to the sound source sensor unit, the camera unit and the wireless communication unit. The camera unit is associated with the sound source sensor unit. When the sound source sensor unit recognizes a target signal, the signal processing unit sends a trigger signal to the camera unit, and then the camera unit is triggered to replay a surveillance video to determine whether or not a target really exists. Compared with the prior art, the device has the advantages of being good in safety, high in reliability and the like.

6 Claims, 1 Drawing Sheet

(51) Int. Cl.
*H04N 5/232* (2006.01)
*H04N 7/18* (2006.01)
*H04R 1/40* (2006.01)
*H04R 3/00* (2006.01)

(58) Field of Classification Search
USPC .............. 381/56, 58, 91, 122, 124, 311, 315
See application file for complete search history.

(56) References Cited

FOREIGN PATENT DOCUMENTS

| CN | 105528841 A | 4/2016 |
| CN | 105528854 A | 4/2016 |
| CN | 107464388 A | 12/2017 |

OTHER PUBLICATIONS

International Search Report of International Application No. PCT/CN2018/093301, dated Oct. 8, 2018, 6 pages, with English translation.

* cited by examiner

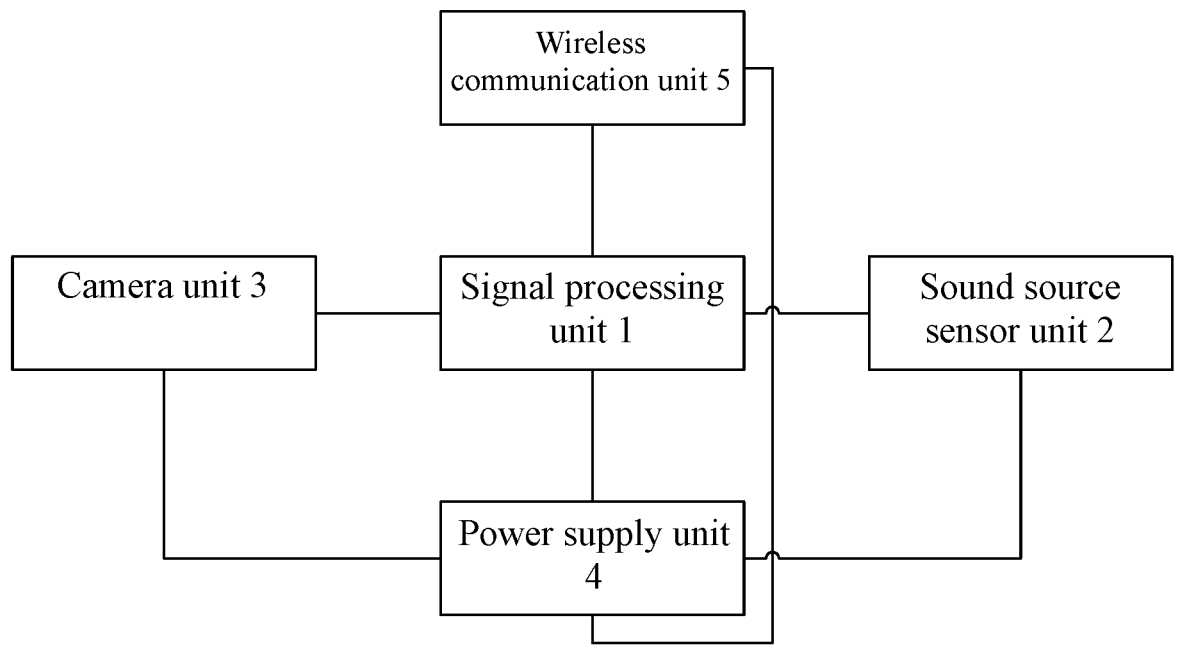

DEVICE FOR PREVENTING CABLES AGAINST EXTERNAL DAMAGE BASED ON SOUND SOURCE LOCALIZATION

TECHNICAL FIELD

The invention relates to safety monitoring technologies for underground power cables, in particular to a device for preventing cables against external damage based on sound source localization.

DESCRIPTION OF RELATED ART

Underground warning belts or vibration optical cables are usually used to prevent underground cables against accidental excavation, wherein the underground warning belts are ex-post warning measures and cannot realize online monitoring; and the work amount for pre-burying the vibration optical fibers used for monitoring is large, the optical fibers may be damaged, interference signals are strong, and the type of excavation machines cannot be accurately recognized. The sound source vibration recognition and localization technique can recognize the type of excavation machines in time, can realize localization and alarm information uploading and can also link with a PTZ camera to determine alarm information.

BRIEF SUMMARY OF THE INVENTION

The objective of the invention is to overcome the defects of the prior art by providing a good-safety and high-reliability device for preventing cables against external damage based on sound source localization.

The following technical solution is adopted by the invention to fulfill the above objective:

A device for preventing cables against external damage based on sound source localization comprises a power supply unit, a sound source sensor unit, a camera unit, a signal processing unit and a wireless communication unit, wherein the sound source sensor unit, the camera unit, the signal processing unit and the wireless communication unit are electrically connected to the power supply unit, and the signal processing unit is connected to the sound source sensor unit, the camera unit and the wireless communication unit.

The camera unit is associated with the sound source sensor unit. When the sound source sensor unit recognizes a target signal, the signal processing unit sends a trigger signal to the camera unit, and then the camera unit is triggered to replay a surveillance video to check whether or not a target really exists.

The sound source sensor unit comprises a sound source recognizer and a sound source locator.

The sound source recognizer sends an acquired sound signal to the signal processing unit, and then the single processing unit extracts features of the sound signal and compares the features of the sound signal with a sound feature fingerprint database to obtain the type of a sound source.

The sound source locator is used to determine the position of the sound source.

The sound source recognizer is connected to the signal processing unit via a USB interface.

The sound source recognizer acquires data via an eight-channel sound array.

The sound source locator is connected with the signal processing unit via a UDP protocol.

The sound source locator conducts cross localization via two four-channel sound arrays, and cross localization is realized according to an azimuth angle measured by the two sound arrays, so that the position of the sound source is worked out.

For pulse signals and non-pulse signals, the sound source locator adopts different localization algorithms to estimate the azimuth angle.

Compared with the prior art, the device for preventing cables against external damage based on sound source localization is installed every 300-500 m, so that once a behavior possibly endangering a cable (such as mechanical excavation) occurs, an alarm can be given in time to reduce power transmission and transformation accidents.

BRIEF DESCRIPTION OF THE SEVERAL VIEWS OF THE DRAWINGS

FIG. 1 is a structural diagram of the invention.

DETAILED DESCRIPTION OF THE INVENTION

A clear and complete description of the technical solution of embodiments of the invention is given as follows in combination with the accompanying drawings of the embodiments. Apparently, the embodiments in the following description are only illustrative ones and are not all possible ones of the invention. All other embodiments achieved by those ordinarily skilled in this field based on these illustrative ones without creative labor should also fall within the protection scope of the invention.

As shown in FIG. 1, a device for preventing cables against external damage based on sound source localization comprises a power supply unit 4, a sound source sensor unit 2, a camera unit 3, a signal processing unit 1 and a wireless communication unit 5, wherein the sound source sensor unit 2, the camera unit 3, the signal processing unit 1 and the wireless communication unit 5 are electrically connected to the power supply unit 4, and the signal processing unit 1 is connected to the sound source sensor unit 2, the camera unit 3 and the wireless communication unit 5.

The camera unit 3 is associated with the sound source sensor unit 2. When the sound source sensor unit 2 recognizes a target signal, the signal processing unit 1 sends a trigger signal to the camera unit 3, and then the camera unit 3 is triggered to replay a surveillance video to check whether or not a target really exists.

Due to the facts that construction facilities make loud sounds in work and different devices make different sounds, the sounds of these mechanical facilities can be used as features to be recognized. Nowadays, sounds of construction machines are recognized mainly by voice recognition methods, such as a linear prediction cepstrum coefficient (LPCC) method and a Mel frequency cepstrum coefficient (MFCC) method which are mature and have a good effect.

Sound signals of machines such as pile drivers, excavators, cutting machines, percussion hammers and handheld electric picks are analyzed in the aspects of time-frequency domain and audio feature (LPCC and MFCC). The sound signals are acquired by sound arrays and are processed by sound source recognition and sound source localization. As for sound source recognition, an eight-channel sound array is used for data acquisition, the sound array used for sound acquisition sends data to an upper computer via a USB, and the features of an acquired sound signal are extracted and are then compared with a sound feature fingerprint database, so that the type of a sound source is obtained. As for sound source recognition, two four-channel sound arrays are used to realize cross localization, and data are transmitted between the localization arrays and the upper computer via a UDP protocol. For pulse signals and non-pulse signals, different localization algorithms are adopted to estimate an azimuth angle, and cross localization is realized according to the azimuth angle measured by the two sound arrays, so that the position of the sound source is worked out.

A video surveillance part is associated with sound source recognition. When a target signal is recognized, the upper computer sends a trigger signal to a camera, and then the camera is triggered to replay a surveillance video to check whether or not a target really exists.

The foregoing embodiments are only specific ones of the invention, and the protection scope of the invention is not limited to these illustrative embodiments. Various equivalent modifications or substitutes easily achieved by any skilled in this field based on the technical solutions of the invention should also fall within the protection scope of the invention. Thus, the protection scope of the invention is subject to the protection scope defined by the claims.

The invention claimed is:

1. A device for preventing cables against external damage based on sound source localization, comprising a power supply unit, a sound source sensor unit, a camera unit, a signal processing unit and a wireless communication unit, wherein the sound source sensor unit, the camera unit, the signal processing unit and the wireless communication unit are electrically connected to the power supply unit, and the signal processing unit is connected to the sound source sensor unit, the camera unit and the wireless communication unit;

the camera unit is associated with the sound source sensor unit; and when the sound source sensor unit recognizes a target signal, the signal processing unit sends a trigger signal to the camera unit, and then the camera unit is triggered to replay a surveillance video to determine whether or not a target really exists, wherein the sound source sensor unit comprises a sound source recognizer and a sound source locator, the sound source recognizer sends an acquired sound signal to the signal processing unit, the signal processing unit extracts features of the sound signal and then compares the features with a sound feature fingerprint database to obtain the type of a sound source, and the sound source locator is used to determine the position of the sound source.

2. The device for preventing cables against external damage based on sound source localization according to claim 1, wherein the sound source locator is connected to the signal processing unit via a USB interface.

3. The device for preventing cables against external damage based on sound source localization according to claim 1, wherein the sound source recognizer acquires data via an eight-channel sound array.

4. The device for preventing cables against external damage based on sound source localization according to claim 1, wherein the sound source locator is connected to the signal processing unit via a UDP protocol.

5. The device for preventing cables against external damage based on sound source localization according to claim 1, wherein the sound source locator conducts cross localization via two four-channel sound arrays, and cross localization is realized according to an azimuth angle measured by the two sound arrays, so that the position of the sound source is worked out.

6. The device for preventing cables against external damage based on sound source localization according to claim 1, wherein for pulse signals and non-pulse signals, the sound source locator adopts different localization algorithms to estimate an azimuth angle.

* * * * *